… (2013.01); *H04W 52/028* (2013.01); *H04W 52/0235* (2013.01); *H04W 52/0251* (2013.01); *H04M 2250/12* (2013.01); *H04Q 2209/883* (2013.01); *H04W 72/02* (2013.01); *Y02B 60/50* (2013.01)

(58) Field of Classification Search
CPC ...... H04W 72/02; H04W 24/00; H04W 8/005
USPC ........ 455/517, 500, 575.1, 557, 556.1, 556.2, 455/567, 573, 572, 127.1, 574, 522, 67.11, 455/403, 422.1, 445, 426.1, 426.2, 41.1, 455/41.2; 340/539.1, 539.23, 540, 5.61
See application file for complete search history.

(56) References Cited

U.S. PATENT DOCUMENTS

2010/0056116 A1\* 3/2010 Kim et al. .................. 455/414.1
2010/0146356 A1\* 6/2010 Park et al. ..................... 714/749
(Continued)

OTHER PUBLICATIONS

International Search Report mailed May 22, 2012 issued in International Appln. No. PCT/JP2012/060991.
(Continued)

*Primary Examiner* — Keith Ferguson
(74) *Attorney, Agent, or Firm* — Adams & Wilks

(57) ABSTRACT

A terminal device has at least one measurement sensor for measuring a physical quantity of a measurement target. A control unit switches the measurement sensor, when activated, from a non-activated state to an activated state. An activation unit, which is driven at lower power consumption than the measurement sensor, activates the control unit when a physical quantity having a correlation with the physical quantity of the measurement target has satisfied a given activation condition.

22 Claims, 5 Drawing Sheets

United States Patent
Tomimatsu et al.

(10) Patent No.: US 9,247,374 B2
(45) Date of Patent: Jan. 26, 2016

(54) TERMINAL DEVICE, COMMUNICATION SYSTEM AND METHOD OF ACTIVATING TERMINAL DEVICE

(75) Inventors: Yutaka Tomimatsu, Chiba (JP); Takeshi Uchiyama, Chiba (JP); Manabu Oumi, Chiba (JP); Koichi Moriya, Chiba (JP); Yoko Shinohara, Chiba (JP); Masataka Shinogi, Chiba (JP)

(73) Assignee: SEIKO INSTRUMENTS INC. (JP)

( \* ) Notice: Subject to any disclaimer, the term of this patent is extended or adjusted under 35 U.S.C. 154(b) by 99 days.

(21) Appl. No.: 14/127,737

(22) PCT Filed: Apr. 24, 2012

(86) PCT No.: PCT/JP2012/060991
§ 371 (c)(1),
(2), (4) Date: Jan. 6, 2014

(87) PCT Pub. No.: WO2012/176547
PCT Pub. Date: Dec. 27, 2012

(65) Prior Publication Data
US 2014/0128118 A1    May 8, 2014

(30) Foreign Application Priority Data
Jun. 23, 2011   (JP) ................................ 2011-139334

(51) Int. Cl.
*H04B 7/00*      (2006.01)
*H04W 4/00*      (2009.01)
*H04Q 9/00*      (2006.01)
(Continued)

(52) U.S. Cl.
CPC ................ *H04W 4/005* (2013.01); *H04Q 9/00*

(51) Int. Cl.
*H04W 52/02* (2009.01)
*H04W 72/02* (2009.01)

(56) References Cited

U.S. PATENT DOCUMENTS

2011/0092164 A1* 4/2011 Spanhake .................. 455/67.11

2011/0248846 A1* 10/2011 Belov et al. ................ 340/539.1

OTHER PUBLICATIONS

Patent Abstracts of Japan, Publication No. 2008-186336, publication date Aug. 14, 2008.

* cited by examiner

TERMINAL DEVICE, COMMUNICATION SYSTEM AND METHOD OF ACTIVATING TERMINAL DEVICE

BACKGROUND OF THE INVENTION

1. Technical Field

The present invention relates to a terminal device for transmitting results obtained by measuring (metering) physical quantities using measurement sensors, a communication system including the terminal device and a method of activating the terminal device.

2. Background Art

In a sensor network system, a sensor terminal device performs transmission of results obtained by measuring physical quantities using measurement sensors to a base station device.

In a wireless sensor described in PTL 1, power of a power supply unit can be supplied when a sensor to be operated without the power is in an on-state, power of the power supply unit is not supplied when the sensor is in an off-state, and a transmission unit performs transmission of given information by wireless communication to the outside by receiving the power of the power supply unit.

CITATION LIST

Patent Literature

PTL 1 JP-A-2007-108884

However, it is necessary to use the sensor operated without the power in the above wireless sensor, specifically, it is necessary to use sensors formed by a magnetic substance, a shape memory alloy, a piezoelectric device and so on, therefore, there is a problem that the degree of freedom in selecting sensors measuring physical quantities is low.

SUMMARY OF THE INVENTION

The present invention has been made in view of the above, and an object thereof is to provide a terminal device, a communication system and a method of activating the terminal device capable of realizing high-performance sensing and lower power consumption.

According to the present invention, there is provided a terminal device including a sensor for measurement (measurement sensor) that measures a physical quantity of a measurement target, a control unit for switching the sensor for measurement from a non-activated state to an activated state when activated, and an activation unit driven at lower power consumption than the sensor for measurement for activating the control unit when a physical quantity having correlation with the physical quantity of the measurement target is satisfied as a given activation condition.

In the terminal device according to the invention, the activation unit may include a sensor for activation (activation sensor) to be driven by generating power based on a change of environment, and may activate the control unit when the given activation condition is satisfied based on a detection result by the sensor for activation.

The terminal device according to the invention may further include a charge unit to be charged by using power generated by the sensor for activation included in the activation unit.

In the terminal device according to the present invention, power generated by the sensor for activation may be stored in the charge unit when the given activation condition is not satisfied.

In the terminal device according to the present invention, an operation in a maintenance mode in which the presence of failure in the sensor for measurement is checked may be performed by using the power stored by the charge unit when the charge unit is charged for an amount equal to or more than a given threshold value.

In the terminal device according to the present invention, the power stored by the charge unit may be supplied to the sensor for measurement when the charge unit is charged for an amount equal to or more than a given threshold value.

In the terminal device according to the present invention, plural sensors for measurement may be provided.

In the terminal device according to the present invention, the control unit may switch the sensor for measurement from the non-activated state to the activated state by switching a state in which power to the sensor for measurement is not supplied to a state in which power is supplied when activated.

According to the present invention, there is provided a communication system including a terminal device, and a base station device, in which the terminal device has a sensor for measurement (measurement sensor) that measures a physical quantity of a measurement target, a control unit for switching the sensor for measurement from a non-activated state to an activated state when activated, an activation unit for activating the control unit when a given activation condition is satisfied, and a communication unit for transmitting information of a measurement result by the sensor for measurement, and the base station device receives information transmitted from the terminal device.

According to the present invention, there is provided a method of activating a terminal device including the steps of activating a control unit by an activation unit when a given activation condition is satisfied, switching a sensor for measurement from a non-activated state to an activated state by the control unit when activated, measuring a physical amount of a measurement target by the sensor for measurement and transmitting by a communication unit information of a measurement result by the sensor for measurement.

The terminal device, the communication system and the method of activating the terminal device according to the present invention realize high-performance sensing and lower power consumption.

DETAILED DESCRIPTION OF THE INVENTION

Hereinafter, embodiments for carrying out the present invention will be explained in detail with reference to the drawings.

(First Embodiment)

Figure 1:
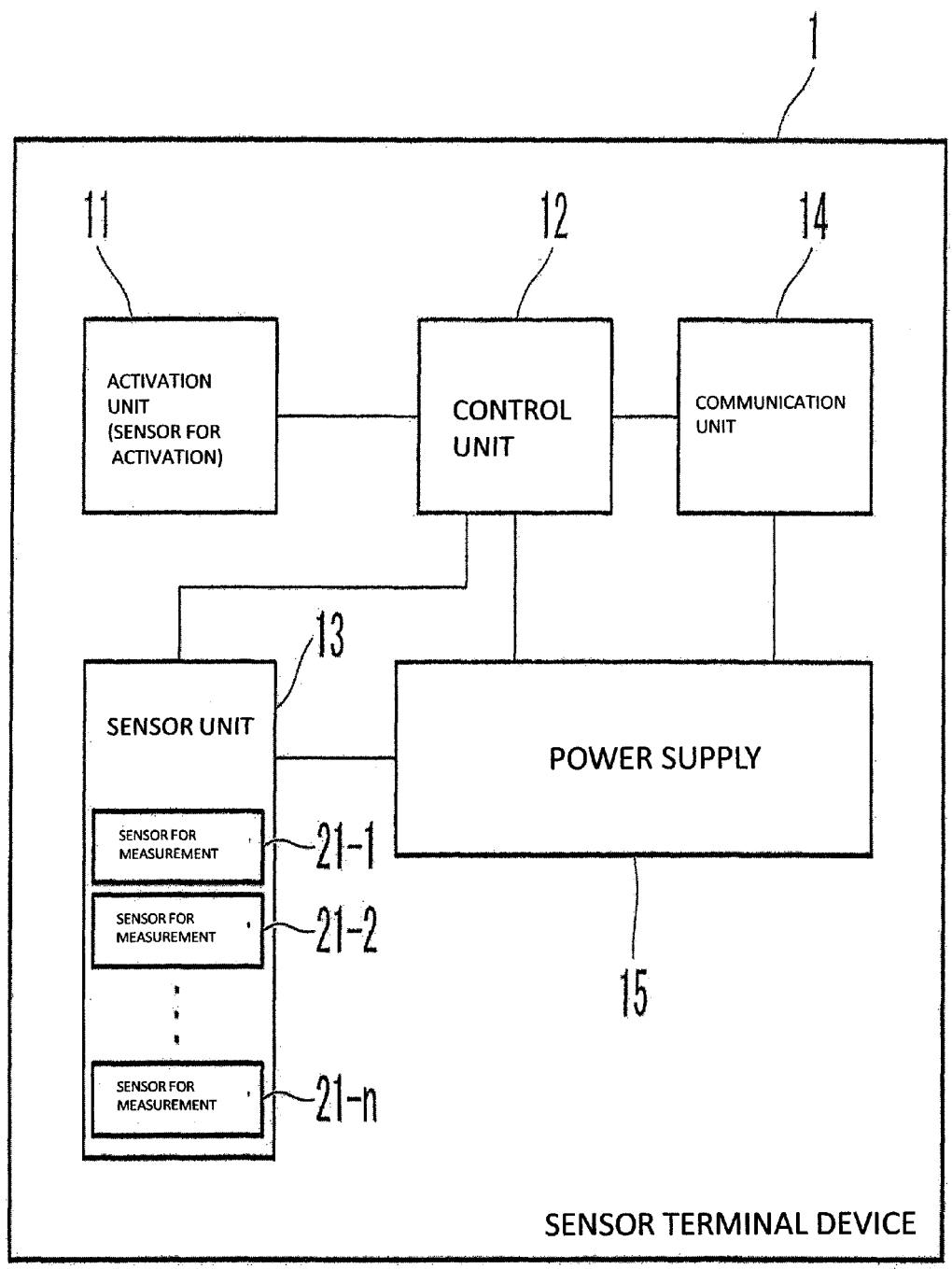
FIG. 1 is a schematic block diagram showing a configuration of a sensor terminal device according to a first embodiment of the present invention.

FIG. 1 is a schematic block diagram showing a configuration of a sensor terminal device 1 (an example of a terminal device) according to a first embodiment of the present invention.

The sensor terminal device 1 according to the embodiment includes an activation unit 11, a control unit 12, a sensor unit 13, a communication unit 14 and a power supply 15. The sensor unit 13 includes sensors for measurement (measurement sensors) 21-1 to 21-n. Though the example in which a plural number of sensors for measurement are provided is shown in FIG. 1, a single sensor for measurement is also preferable.

The activation unit 11 includes one or more sensors for activation (activation sensors) that detect a change of environment around the sensor terminal device 1. When the sensor for activation detects that the change of environment around the sensor terminal device 1 has satisfied a given activation condition, the activation unit 11 transmits a given signal to the control unit 12 as an interrupt signal to the control unit 12. As described above, the activation unit 11 functions as a switch for activation.

Here, in the embodiment, the activation unit 11 has a circuit configuration for transmitting, as the given signal, a signal in a level exceeding a given threshold value for activating the control unit 12 as the interrupt signal when the change of environment around the sensor terminal device 1 satisfies the given activation condition.

In the embodiment, the interrupt signal is transmitted to the control unit 12 when the sensor for activation detects that the change of environment around the sensor terminal device 1 has satisfied the given activation condition. As another example, it is also possible to apply a configuration in which the sensor for activation constantly transmits signals corresponding to detection results as interrupt signals, and interruption is actually performed with respect to the control unit 12 when the level of the interrupt signal inputted to the control unit 12 exceeds the given threshold value.

Here, as the activation condition for transmitting the interrupt signal to the control unit 12 by the activation unit 11, various conditions may be used, and for example, a condition that variation in environment around the sensor terminal device 1 exceeds a given threshold value can be used.

The interrupt signal is used as the signal for activating the control unit 12 by the activation unit 11 in the embodiment, however, other signals may be used.

In the case where plural sensors for activation are provided in the activation unit 11, it is possible to apply a configuration as an example in which respective sensors for activation are independently operated and the interrupt signal is transmitted to the control unit 12 when a change of surrounding environment satisfying the given activation condition is detected, and the configuration is used in the embodiment. It is also possible to apply a configuration as another example in which the interrupt signal is transmitted to the control unit 12 by the activation unit 11 when a combination of detection states of plural sensors for activation provided in the activation unit 11 satisfies the given activation condition.

In the case where the plural sensors for activation are provided in the activation unit 11, it is possible to use sensors detecting the same physical quantity with the same sensitivity and resolution, sensors detecting the same physical quantity with different sensitivities and resolutions, sensors detecting different physical quantities or combinations of above sensors as these plural sensors for activation.

Though the power is constantly supplied to the control unit 12 from the power supply 15, the control unit 12 is normally in a sleep mode. Then, the control unit 12 is activated when an input value of the interrupt signal from the activation unit 11 at an input end exceeds the given threshold value.

As described above, when the interrupt signal is inputted to the control unit 12 from the activation unit 11, the control unit 12 makes a transition from the sleep mode to an activation state in the embodiment.

Though the sleep mode is used as a state in which the control unit 12 is not activated in the embodiment, other states in which power consumption is lower than the activated state may be used as other examples.

Here, in the embodiment, a sensor not requiring power for detecting a change of surrounding environment is used as the sensor for activation. Accordingly, the activation unit 11 is not connected to the power supply 15.

As the sensor for activation, sensors detecting various objects (physical quantities) may be used, and for example, sensors using materials such as a magnetic substance, a thermoelectric device, a piezoelectric device and a pyroelectric device can be used. In such sensors for activation, power consumption during standby is substantially zero, and the sensors can detect a change of environment (for example, any of electromagnetic waves, temperature, pressure, airflow, sound waves, fine-grain flow and so on) in which the sensor terminal device 1 is placed.

As a specific example, when a flow sensor using a piezoelectric substance as the sensor for activation, a voltage corresponding to a flow velocity is generated. In this case, when the velocity of fluid around the sensor terminal device 1 exceeds a certain value, the control unit 12 is activated. A power-generation type acceleration sensor and so on can be used as the sensor for activation in addition to the above.

Though the sensor not requiring supply of the power from the outside for detecting a change of surrounding environment is used as the sensor for activation in the embodiment, it is also preferable that a sensor requiring supply of lower power than the sensors for measurement from the outside for detecting a change of surrounding environment is used as another example. In this case, for example, a configuration in which a battery is provided in the sensor for activation and power from the battery is supplied to the sensor for activation, or a configuration in which power from the power supply 15 provided in the sensor terminal device 1 is supplied to the sensor for activation can be applied. The sensor terminal device with low power consumption can be realized by using the sensor for activation to be driven with lower power consumption than the sensors for measurement while receiving supply of power from the outside.

The control unit 12, when being activated, activates respective sensors for measurement 21-1 to 21-n by supplying power from the power supply 15 to the respective sensors for measurement 21-1 to 21-n provided in the sensor unit 13.

The respective sensors for measurement 21-1 to 21-n, when being activated, measure respective measurement targets (physical quantities) in a measurement time after a preparation time has passed. The measurement results are outputted to the control unit 12.

Here, sensors requiring power for detecting a change of surrounding environment are used as the respective sensors for measurement 21-1 to 21-n in the embodiment. It is also preferable that sensors not requiring power for detecting a change of surrounding environment are used for part of the respective sensors for measurement 21-1 to 21-n as another example, and such sensors can be also used as the sensors for activation in the embodiment.

It is also preferable that various types of sensors are used as the respective sensors for measurement 21-1 to 21-n, which are, for example, a vibration sensor, an acceleration sensor, a video camera, a smoke sensor, a humidity sensor and so on can be used. Then, various degrees such as temperature, humidity, a flow rate, flow velocity, illuminance and human motion can be measured by the respective sensors for measurement 21-1 to 21-n.

In the embodiment, there is a correlation (causal relationship) between targets (physical quantities) measured by the sensors for measurement 21-1 to 21-n and targets (physical quantities) measured by the sensor for activation. As examples of correlated targets, there are the same physical quantity as a physical quantity detected by the sensor for activation, or a different physical quantity assumed to be changed when a change of a physical quantity as a target is detected by the sensor for activation. As a specific example, light, vibration, temperature and so on can change when a person passes, therefore, one or more physical quantities of the above are detected by the sensor for activation, and one or more physical quantities which are the same as or different from each other of the above can be measured by the sensors for measurement 21-1 to 21-n.

Though the sensors outputting the measurement results by analog signals in the measurement time are used as the respective sensors for measurement 21-1 to 21-n in the embodiment, sensors outputting measurement results by digital signals may be used as another example.

In the embodiment, the control unit 12 is digitally operated. The measurement results outputted by the sensors for measurement 21-1 to 21-n by analog signals are converted from analog signals to digital signals by an A/D (Analog to Digital) converter.

As a preferred example of the embodiment, the control unit 12 becomes the sleep mode to suppress the power consumption while the respective sensors for measurement 21-1 to 21-n are in the preparation time. After the respective sensors for measurement 21-1 to 21-n complete the preparation time, the control unit 12 is activated again and acquires measurement results by the respective sensors for measurement 21-1 to 21-n. Here, as the configuration in which the control unit 12 becomes the sleep mode while the respective sensors for measurement 21-1 to 21-n are in the preparation time, it is also preferable to apply a configuration, for example, in which the control unit 12 is returned to the activated state from the sleep mode slightly before the preparation time of the respective sensors for measurement 21-1 to 21-n ends. Additionally, when a certain sensor for measurement is in the preparation time but it is necessary to acquire the measurement result by another sensor for measurement, the control unit 12 is in the activated state without becoming in the sleep mode.

The control unit 12 outputs the measurement results acquired by being inputted by the respective sensors for measurement 21-1 to 21-n to the communication unit 14.

The communication unit 14 transmits the measurement results inputted from the control unit 12 to a base station device (not shown in FIG. 1). In the communication unit 14, wired communication may be performed as well as wireless communication may be performed.

The power supply 15 supplies power to the control unit 12, the respective sensors for measurement 21-1 to 21-n provided in the sensor unit 13 and the communication unit 14. In the embodiment, the control unit 12 controls the supply of power from the power supply 15 to the respective sensors for measurement 21-1 to 21-n provided in the sensor unit 13. As the power supply 15, for example, a battery such as a storage battery can be used.

Figure 2:
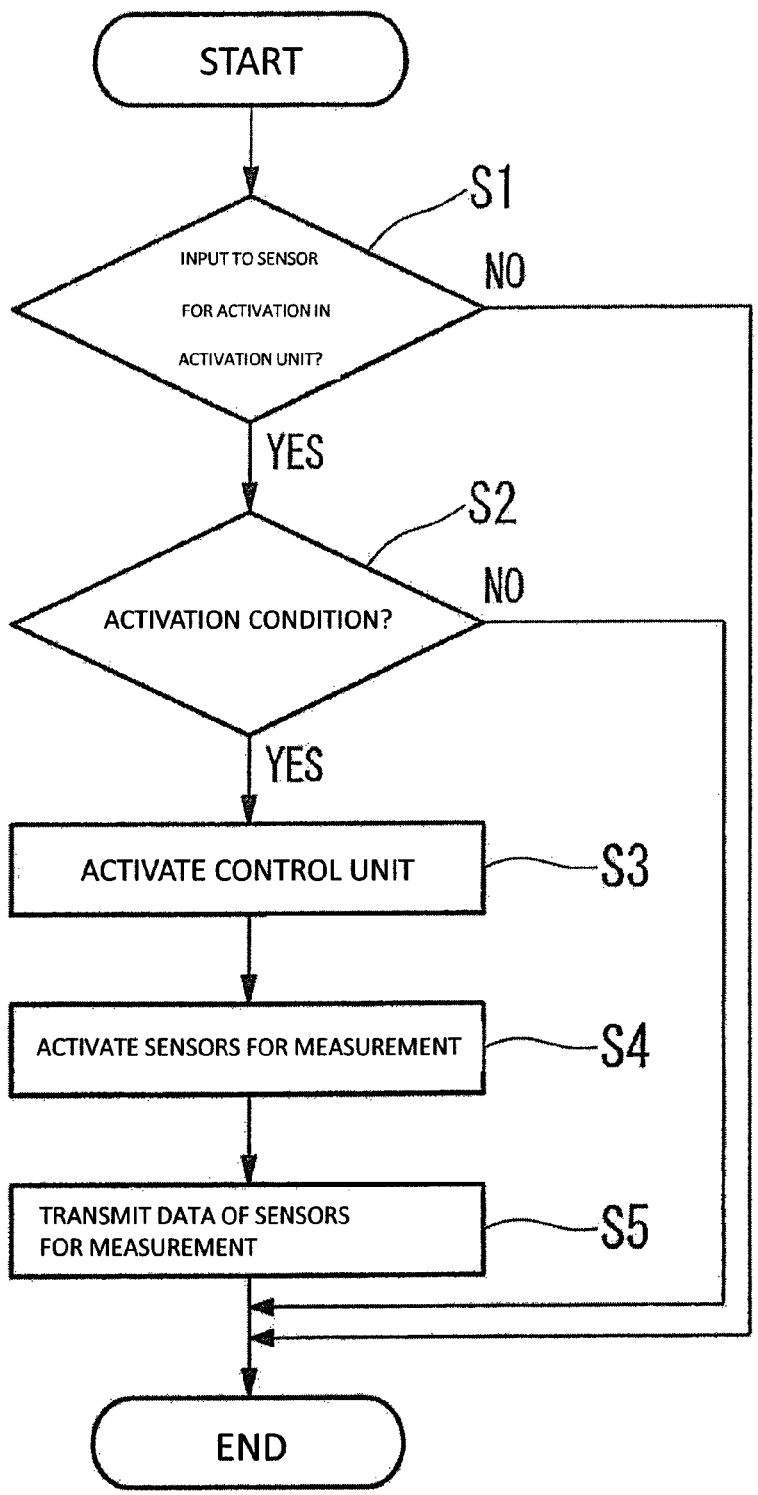
FIG. 2 is a view showing a flowchart of an operation performed by the sensor terminal device according to the first embodiment of the present invention.

FIG. 2 is a view showing a flowchart of an operation performed by the sensor terminal device 1 according to the embodiment.

In the explanation of the flowchart, the explanation will be made by taking the operation corresponding to presence/absence of detection of a detection target by the sensor for activation provided in the activation unit 11 as one operation, however, such operation is constantly performed in the embodiment.

When there is no input of a detection target (variation in environment around the sensor terminal device 1 in the embodiment) to the sensor for activation provided in the activation unit 11 while the control unit 12 is in the sleep mode (Step 1), the detection target is not detected by the sensor for activation, therefore, the control unit 12 continues in the sleep mode.

When there is an input of the detection target to the sensor for activation provided in the activation unit 11 while the control unit 12 is in the sleep mode (Step 1), in the case where the a given activation condition is not satisfied (Step S2), for example, in the case where the level of the input is lower than a given threshold value, the control unit 12 continues in the sleep mode.

When there is an input of the detection target to the sensor for activation provided in the activation unit 11 while the control unit 12 is in the sleep mode (Step 1), in the case where the given activation condition is satisfied (Step S2), for example, in the case where the level of the input is equal to or higher than the given threshold value, the sensor for activation outputs an interrupt signal to the control unit 12.

When the interrupt signal is inputted from the activation unit 11 (the sensor for activation provided in the activation unit 11 in the embodiment) during the sleep mode, the control unit 12 makes a transition to the activated state and is driven (Step S3). Then, the control unit 12 is activated and performs control so as to supply the power from the power supply 15 to the respective sensors for measurement 21-1 to 21-n. Accordingly, the respective sensors for measurement 21-1 to 21-n are activated (Step S4).

The respective sensors for measurement 21-1 to 21-n are activated and measure the measurement targets, then, output the measurement results to the control unit 12. The control unit 12 outputs the measurement results inputted from the respective sensors for measurement 21-1 to 21-n to the communication unit 14. The communication unit 14 transmits the measurement results inputted from the control unit 12 to the base station device (not shown in FIG. 1) (Step S5).

In the embodiment, when the control unit 12 is activated by the activation unit 11 while the control unit 12 is in the sleep mode, the respective sensors for measurement 21-1 to 21-n are activated by performing control by the control unit 12 so as to supply power from the power supply 15 to the respective sensors for measurement 21-1 to 21-n, measurement by the respective sensors for measurement 21-1 to 21-n is performed and the measurement results are transmitted from the communication unit 14 through the control unit 12, the control unit 12 performs control so as to stop supplying power from the power supply 15 to the sensors for measurement 21-1 to 21-n which have completed acquisition of measurement results, then, the control unit 12 makes a transition to the sleep mode again when processing of acquiring measurement results is completed.

As described above, the sensor terminal device 1 according to the embodiment can stand by in a state in which power is not used by the control unit 12 and the sensors for measurement 21-1 to 21-n until the sensor for activation for activating the control unit 12 which controls the sensors for measurement 21-1 to 21-n activates the control unit 12, which can save power. However, in the case where the control unit 12 consumes power during the sleep mode, power for that will be used.

The above effect can be also obtained when the sensor for activation does not generate power by itself and is driven by receiving supply of power lower than that used by the sensors for measurement from the power supply 15. Additionally, when the sensor for activation is driven by generating power by itself in accordance with a change of environment, further power saving effect can be obtained.

The above power-saving effect can be also obtained in the entire sensor network in which the sensor terminal device 1 is provided, which can reduce power consumption of the entire network. In particular, when applied to an application in which ratio of time in which sensing is necessary occupying the real time is low, the effect of reducing power consumption is large.

Therefore, it is possible to drastically reduce power consumption (standby power) and for example, the lifetime of the power supply 15 formed by the battery can be extended in the sensor terminal device 1 according to the embodiment. Accordingly, the frequency and costs of maintenance such as battery exchange with respect to the sensor terminal device 1 can be reduced and effects given to environment by the sensor network (for example, power consumption and disposition of the battery) can be also reduced. In the case where it is sufficient that the lifetime of the battery 15 is the same as that of a device not according to the embodiment, the size of, for example, the battery used as the power supply 15 can be reduced, and thus, the size of the sensor terminal device 1 can be reduced.

Additionally, as the control unit 12 and the sensors for measurement 21-1 to 21-n operate only when the given activation condition is satisfied based on the change of surrounding environment, the device is efficient.

When the power-generation type sensor is used as the sensor for activation, the interrupt signal to the control unit 12 is easily generated.

The sensor terminal device 1 according to the embodiment includes the sensors for measurement 21-1 to 21-n separately from the sensor for activation, therefore, it is possible to allow these sensors to be different from each other.

Accordingly, the degree of freedom in selecting sensors (the degree of freedom in design) can be increased with respect to the sensors for measurement 21-1 to 21-n and various types of sensors can be used, which increases the function of the sensor terminal device 1.

Therefore, high-performance sensing and lower power consumption can be realized in the sensor terminal device 1 according to the embodiment.

Here, the configuration of the sensor terminal device 1 according to the embodiment can be also regarded as follows.

That is, the sensor terminal device 1 includes one or more sensors for measurement 21-1 to 21-n, the control unit 12 switching between a first power consumption state in which the sensors for measurement 21-1 to 21-n are in a non-activated state and a second power consumption state in which the sensors for measurement 21-1 to 21-n are in an activated state and power is consumed more than in the first power consumption state, the activation unit 11 transmitting the interrupt signal activating the control unit 12 with respect to the control unit 12, the communication unit 14 performs communication of information of measurement results obtained from the sensors for measurement 21-1 to 21-n through the control unit 12 with the outside and the power supply 15 supplying power to the sensors for measurement 21-1 to 21-n, the control unit 12 and the communication unit 14.

Moreover, the method of activating the above sensor terminal device 1 can be also regarded as follows.

That is, the sensor terminal device 1 includes a step of activating the activation unit 11 based on a change of environment, a step of transmitting the interrupt signal to the control unit 12 by the activated activation unit 11 to activate the control unit 12, and a step of switching between the first power consumption state in which the sensors for measurement 21-1 to 21-n are in the non-activated state and the second power consumption state in which the sensors for measurement 21-1 to 21-n are in the activated state and power is consumed more than in the first power consumption state depending on the activation state.

Here, in the first power consumption state, it is not always necessary to use the state in which power consumption of the control unit 12 is zero, and for example, power lower than that used at the time of activation may be consumed by the control unit 12.

(Second Embodiment)

Figure 3:
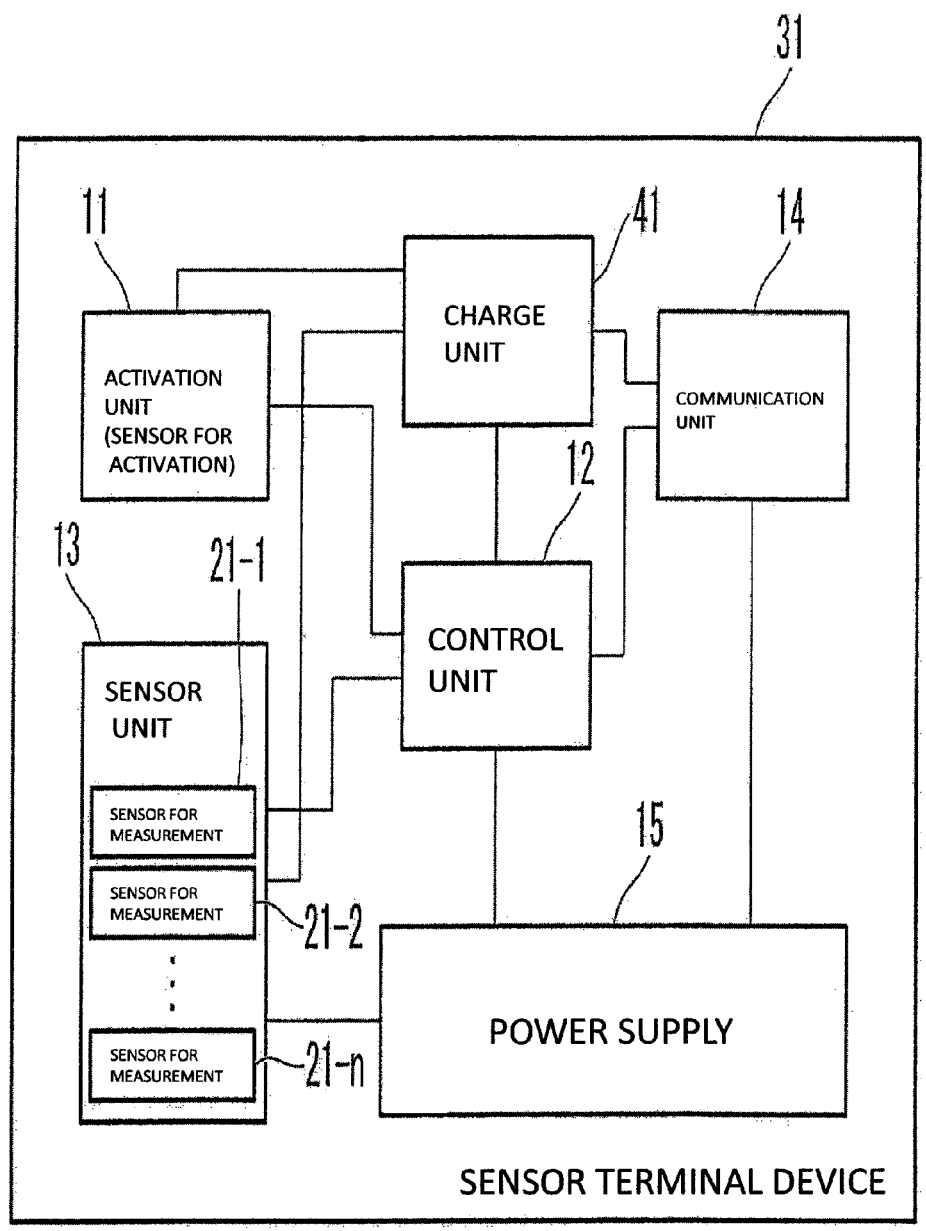
FIG. 3 is a schematic block diagram showing a configuration of a sensor terminal device according to a second embodiment of the present invention.

FIG. 3 is a schematic block diagram showing a configuration of a sensor terminal device 31 (an example of a terminal device) according to a second embodiment of the present invention.

The sensor terminal device 31 according to the embodiment includes the activation unit 11, the control unit 12, the sensor unit 13, the communication unit 14 and the power supply 15 as the same configuration units as units included in the sensor terminal device 1 according to the first embodiment shown in FIG. 1, and further includes a charge unit 41.

Here, the configuration and operation of the sensor terminal device 31 according to the embodiment are the same as the sensor terminal device 1 according to the first embodiment shown in FIG. 1 except a part relating to a point of including the charge unit 41, and the different point will be explained in detail in the present embodiment.

In the embodiment, a sensor not requiring power for detecting a change of surrounding environment and being driven by generating power by itself in accordance with the change of environment is used as the sensor, for activation provided in the activation unit 11.

In the embodiment, when an amount of power generation performed based on the change of environment in the sensor for activation is not sufficient for activating the control unit 12, namely, when the given activation condition is not satisfied, the activation unit 11 stores power in (charges) the charge unit 41.

Here, when the amount of power generation performed based on the change of environment in the sensor for activation is sufficient for activating the control unit 12, namely, when the given activation condition is satisfied, it is also preferable to apply a configuration in which the activation unit 11 activates and drives the control unit 12 by using the generated power as well as stores excessive power in the generated power in the charge unit 41 as another example. It is further preferable to apply a configuration, for example, in which the activation unit 11 stores the generated power in the charge unit 41 in the above both cases where the given activation condition is not satisfied and is satisfied.

The charge unit 41 is charged by power supplied from the activation unit 11, and can supply the charged power to the control unit 12, the sensors for measurement 21-1 to 21-n provided in the sensor unit 13 and the communication unit 14.

In the present embodiment, a configuration in which the charge unit 41 supplies power to the sensors for measurement 21-1 to 21-n is applied, specifically, when the charge unit 41 is completely charged, the power supply to the sensors for measurement 21-1 to 21-n is performed from the charge unit 41. Additionally, when the charge unit 41 is completely charged, an operation in a maintenance mode in which the presence of failure in the sensors for measurement 21-1 to 21-n is checked is executed by using power from the charge unit 41.

Here, the function of executing the operation in the maintenance mode is provided in, for example, the sensor unit 13.

As the charge unit 41, the storage battery (secondary battery) is used in the present embodiment, and a capacitor and so on can be used as other examples.

Through the configuration in which the power supply to the sensors for measurement 21-1 to 21-n and the operation in the maintenance mode in which the presence of failure in the sensors for measurement 21-1 to 21-n is checked are performed when the charge unit 41 is completely charged in the present embodiment, it is also possible to apply a configuration in which the power supply and the operation in the maintenance mode are performed when the charge unit 41 is charged for an amount equal to or more than a given threshold value which has been arbitrarily set as another example.

Figure 4:
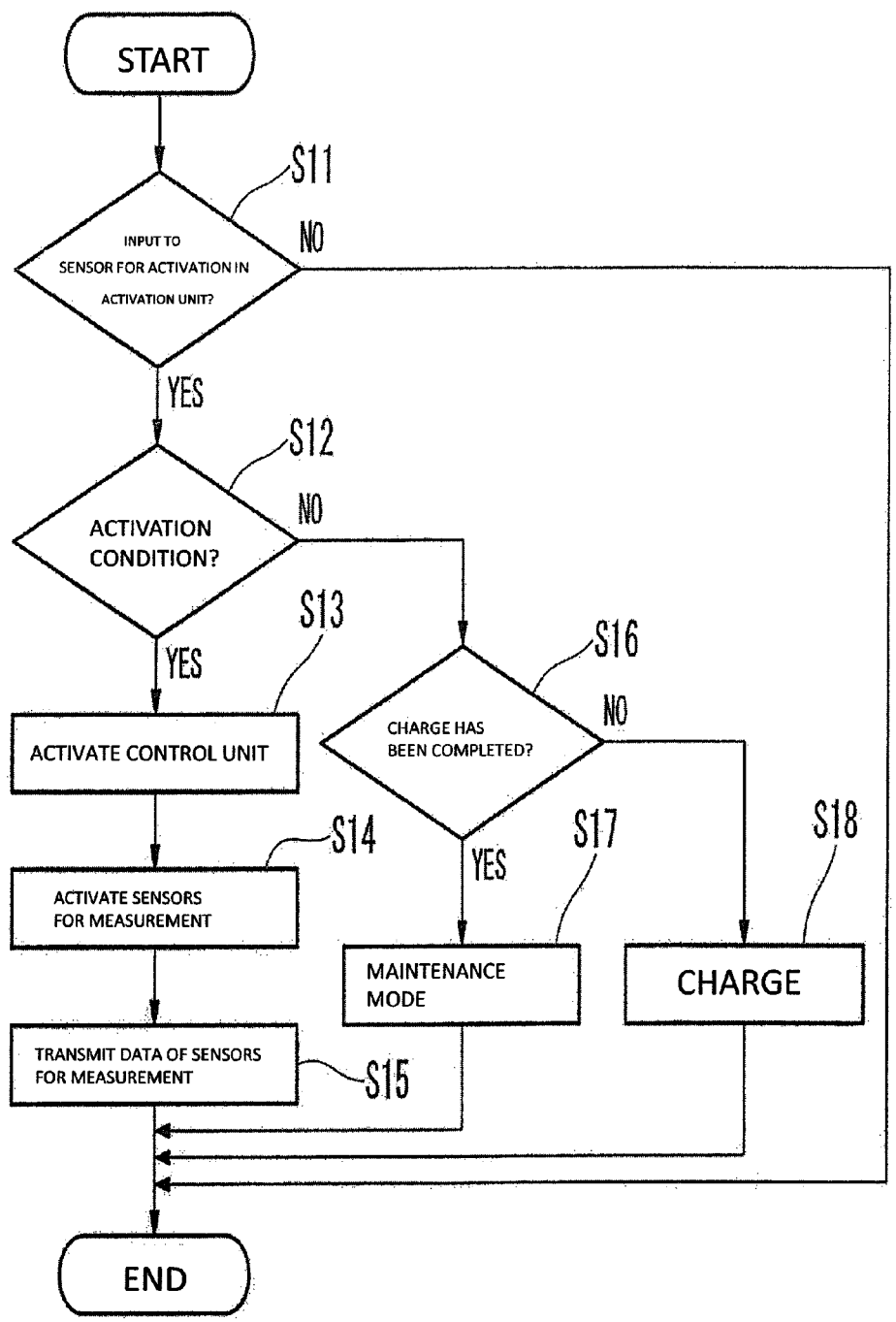
FIG. 4 is a view showing a flowchart of an operation performed by the sensor terminal device according to the second embodiment of the present invention.

FIG. 4 is a view showing a flowchart of an operation performed by the sensor terminal device 31 according to the embodiment.

In the explanation of the flowchart, the explanation will be made by taking the operation corresponding to the presence/absence of detection of a detection target by the sensor for activation provided in the activation unit 11 as one operation, however, such operation is constantly performed in the embodiment.

When there is no input of a detection target (variation in environment around the sensor terminal device 31 in the embodiment) to the sensor for activation provided in the activation unit 11 while the control unit 12 is in the sleep mode (Step S11), the detection target is not detected by the sensor for activation, therefore, the control unit 12 continues in the sleep mode.

When there is an input of the detection target to the sensor for activation provided in the activation unit 11 while the control unit 12 is in the sleep mode (Step S11), in the case where the input satisfies the given activation condition (Step S12), for example, in the case where the level of the input is equal to or higher than the given threshold value, the sensor for activation outputs an interrupt signal to the control unit 12.

When the interrupt signal is inputted from the activation unit 11 (the sensor for activation provided in the activation unit 11 in the embodiment) during the sleep mode, the control unit 12 makes a transition to the activated state and is driven (Step S13). Then, the control unit 12 is activated and performs control so as to supply the power from the power supply 15 to the respective sensors for measurement 21-1 to 21-n. Accordingly, the respective sensors for measurement 21-1 to 21-n are activated (Step S14).

The respective sensors for measurement 21-1 to 21-n are activated and measure the measurement target, then, output the measurement results to the control unit 12. The control unit 12 outputs the measurement results inputted from the respective sensors for measurement 21-1 to 21-n to the communication unit 14. The communication unit 14 transmits the measurement results inputted from the control unit 12 to the base station device (not shown in FIG. 3) (Step S15).

When there is an input of the detection target to the sensor for activation provided in the activation unit 11 while the control unit 12 is in the sleep mode (Step S11), in the case where the input does not satisfy a given activation condition (Step S12), for example, in the case where the level of the input is lower than a given threshold value, the control unit 12 continues in the sleep mode. Then, in this case, when the charge unit 41 has been fully charged and the charge has been completed (Step S16), the operation in the maintenance mode is executed by using power stored in the charge unit 41 (Step S17). On the other hand, when there is an input of the detection target to the sensor for activation provided in the activation unit 11 (Step S11), and the input does not satisfy a given activation condition, for example, in the case where the level of the input is lower than a given threshold value, in the case where the charge unit 41 has not been fully charged and the charge has not been completed (Step S16), the charge unit 41 is charged from the activation unit 11 (Step S18).

In the embodiment, when the control unit 12 is activated by the activation unit 11 while the control unit 12 is in the sleep mode, the respective sensors for measurement 21-1 to 21-n are activated by performing control by the control unit 12 so as to supply power from the power supply 15 to the respective sensors for measurement 21-1 to 21-n, measurement by the respective sensors for measurement 21-1 to 21-n is performed and the measurement results are transmitted from the communication unit 14 through the control unit 12, the control unit 12 performs control so as to stop supplying power from the power supply 15 to the sensors for measurement 21-1 to 21-n which have completed acquisition of measurement results, then, the control unit 12 makes a transition to the sleep mode again.

As described above, high-performance sensing and lower power consumption can be realized in the sensor terminal device 31 according to the embodiment in the same manner as the sensor terminal device 1 according to the first embodiment.

Additionally, power generated by the activation unit 11 is stored in the charge unit 41 and the stored power is used in the sensor terminal device 31 according to the embodiment, thereby reducing power consumption of the power supply 15.

Also in the sensor terminal device 31 according to the embodiment, the operation of maintenance of the sensors for measurement 21-1 to 21-n is executed by using power stored in the charge unit 41, therefore, for example, failure can be known in advance before the measurement is actually performed by the sensors for measurement 21-1 to 21-n and occurrence of an error caused as the failed sensors for measurement 21-1 to 21-n are not driven can be prevented.

Here, for example, failure is easily found by performing communication at fixed intervals in the sensor terminal device which performs communication at fixed intervals, however, communication is performed at odd intervals in the sensor terminal device 31 according to the embodiment as the communication is performed when the activation condition in the activation unit 11 is satisfied, therefore, it can be considered that failure is difficult to be found. On the other hand, in the sensor terminal device 31 according to the embodiment, failure can be found by executing the operation of maintenance even when the control unit 12 is not activated, which can obtain large effects. Concerning the maintenance, a configuration and operation in which, for example, a timer is provided to be activated at fixed intervals to detect the presence of failure in the sensors for measurement is not necessary in the sensor terminal device 31 according to the embodiment, therefore, the timer necessary for such configuration and operation is omitted to thereby reduce power consumption.

(Third Embodiment)

Figure 5:
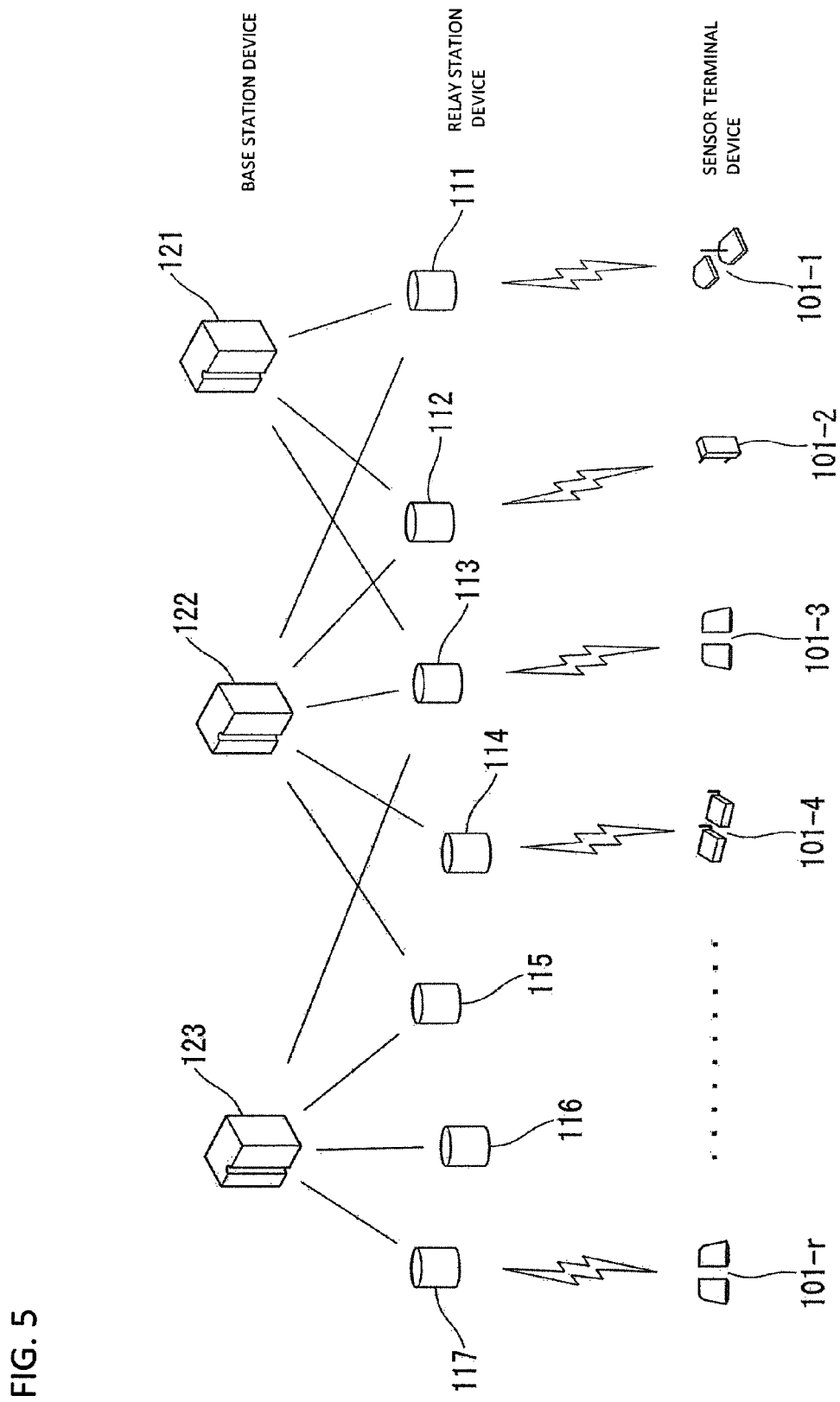
FIG. 5 is a schematic block diagram showing a configuration of a sensor network system according to a third embodiment of the present invention.

FIG. 5 is a schematic block diagram showing a configuration of a sensor network system (an example of a communication system) according to a third embodiment of the present invention.

The sensor network system according to the embodiment includes plural (r-pieces) terminal devices 101-1 to 101-r (examples of the terminal devices), plural relay station devices 111 to 117 and plural base station devices 121 to 123.

The respective numbers of the sensor terminal devices, the relay station devices and the base station devices may be arbitrarily set.

The respective sensor terminal devices 101-1 to 101-r have the same configuration and perform the same operation as, for example, the sensor terminal device 1 according to the first embodiment shown in FIG. 1 or the sensor terminal device 31 according to the second embodiment shown in FIG. 3. For example, the respective sensor terminal devices 101-1 to 101-r transmit information (data) of measurement results by the sensors for measurement included in the respective devices by wireless.

The respective relay station devices 111 to 117 receive information transmitted by wireless from the sensor terminal devices 101-1 to 101-r existing in areas where the respective devices performs communication and transmit the information by wired communication.

The respective base station devices 121 to 123 receive information transmitted by wired communication from the relay station devices 111 to 117 existing under the respective devices.

Accordingly, in the sensor network system according to the embodiment, information of measurement results by the sensors for measurement provided in the respective sensor terminal devices 101-1 to 101-r is collected by the base station devices 121 to 123 and the information is managed by being stored in a storage device (not shown) and so on.

Though the configuration in which information transmitted from the sensor terminal devices 101-1 to 101-r is transmitted to the base station devices 121 to 123 through the relay station devices 111 to 117 is shown in the embodiment, it is also preferable to apply a configuration in which information transmitted from the sensor terminal devices 101-1 to 101-r is directly transmitted to the base station devices 121 to 123 as another example.

In respective communication, wired communication as well as wireless communication may be used, not limited to the embodiment.

Here, the sensor network system according to the embodiment may be applied to various scenes, for example, may be applied to a sensor network in a clean room, a sensor network in home security, a sensor network in environmental monitoring and so on. As an example, it is possible that particle sensors, flow sensors and so on are provided as sensors for measurement in the respective sensor terminal devices 101-1 to 101-r in the sensor network in the clean room, and measurement results by these sensors for measurement are collected and managed by the base station devices 121 to 123.

Note that, in the sensor terminal device 1 according to the first embodiment and the sensor terminal device 31 according to the second embodiment, part of the device, for example, the function of the control unit 12 may be realized by a computer. In this case, the function may be realized by recording a program for realizing the control function in a recording medium readable by the computer and reading the program recorded in the recording medium by a computer system to execute the program by the computer system. The computer system referred to in this case includes an operating system (OS), hardware of peripheral devices. The recording media readable by the computer indicate portable recording media such as a flexible disk, a magneto-optical disk, an optical disk and a memory card as well as storage devices such as a magnetic hard disk and a solid state drive included in the computer system. Moreover, the recording media readable by the computer may also include media dynamically holding the program for a short period of time such as a computer network of Internet and a communication line used when transmitting the program through a phone line or a cellular phone network as well as media holding the program for a certain period of time such as a server device and a volatile memory inside the computer system to be a client in the above case. Furthermore, the above program may be a program for realizing part of the above function and further, may be realized by combination with a program in which the above function has been already recorded in the computer system.

The embodiments of the present invention have been described as the above with reference to the drawings, and the specific configurations are not limited to the embodiments, and design and the like within a range not departing from the gist of the invention are included.

The terminal device, the communication system and the method of activating the terminal device can be applied to, for example, various types of sensor networks.

REFERENCE SIGNS LIST 1 sensor terminal device
11 activation unit
12 control unit
13 sensor unit
14 communication unit
15 power supply
21-1 to 21-n sensors for measurement
31 sensor terminal device
41 charge unit
101-1 to 101-r sensor terminal devices
111 to 117 relay station devices
121 to 123 base station devices

The invention claimed is:

1. A terminal device comprising:
at least one measurement sensor for measuring a physical quantity of a measurement target;
a control unit for switching the measurement sensor, when activated, from a non-activated state to an activated state; and
an activation unit, which is driven at lower power consumption than the measurement sensor, for activating the control unit when a physical quantity having a correlation with the physical quantity of the measurement target has satisfied a given activation condition.

2. The terminal device according to claim 1, wherein the activation unit includes an activation sensor for detecting a change of environment, the activation unit being configured to be driven by generating power based on the detected change of environment and to activate the control unit when the given activation condition is satisfied based on a detection result by the activation sensor.

3. The terminal device according to claim 2, further comprising a charge unit configured to be charged by using power generated by the activation sensor of the activation unit.

4. The terminal device according to claim 3, wherein the measurement sensor is configured to perform an operation in a maintenance mode in which the presence of failure in the measurement sensor is checked by using power stored by the charge unit when the charge unit is charged for an amount equal to or more than a given threshold value.

5. The terminal device according to claim 4, wherein the power stored by the charge unit is supplied to the measurement sensor when the charge unit is charged for an amount equal to or more than a given threshold value.

6. The terminal device according claim 1, wherein the at least one measurement sensor comprises a plurality of measurement sensors.

7. The terminal device according to claim 1, wherein the control unit is configured to switch the measurement sensor from the non-activated state to the activated state by switching a state in which power to the measurement sensor is not supplied to a state in which, when activated, power is supplied.

8. The terminal device according to claim 1, wherein the activation unit includes a least one activation sensor for detecting a change of environment as the physical quantity having a correlation with the physical quantity of the measurement target, the activation unit being configured to transmit an interrupt signal to the control unit to activate the control unit when the change of environment detected by the activation sensor has satisfied the given activation condition.

9. The terminal device according to claim 8, wherein the activation unit is configured to transmit a signal with a level exceeding a given threshold value as the interrupt signal to activate the control unit.

10. The terminal device according to claim 8, wherein the at least one activation sensor comprises a plurality of independently operated activation sensors.

11. The terminal device according to claim 1, wherein the activation unit includes at least one activation sensor for detecting a change of environment as the physical quantity having a correlation with the physical quantity of the measurement target, and for constantly transmitting to the control unit interrupt signals corresponding to detection results, the control unit being activated when the level of the interrupt signal transmitted to the control unit exceeds a given threshold value.

12. The terminal device according to claim 1, wherein the activation unit includes a plurality of activation sensors for detecting a change of environment as the physical quantity having a correlation with the physical quantity of the measurement target, the activation unit being configured to transmit an interrupt signal to the control unit to activate the control unit when a combination of detection states of the plurality of activation sensors satisfies the given activation condition.

13. The terminal device according to claim 3, wherein power generated by the activation sensor is stored in the charge unit when the given activation condition is not satisfied.

14. The terminal device according to claim 13, wherein the power stored by the charge unit is supplied to the measurement sensor when the charge unit is charged for an amount equal to or more than a given threshold value.

15. The terminal device according to claim 13, wherein the measurement sensor is configured to perform an operation in a maintenance mode in which the presence of failure in the measurement sensor is checked by using the power stored by the charge unit when the charge unit is charged for an amount equal to or more than a given threshold value.

16. A communication system comprising:
a terminal device having at least one measurement sensor for measuring a physical quantity of a measurement target, a control unit for switching the measurement sensor, when activated, from a non-activated state to an activated state, an activation unit for activating the control unit when a given activation condition is satisfied, and a communication unit for transmitting information of a measurement result by the measurement sensor; and
a base station device that receives information transmitted from the terminal device.

17. A communication system according to claim 16, wherein the activation unit of the terminal device includes an activation sensor for detecting a change of environment, the activation unit being configured to be driven by generating power based on the change of environment and to activate the control unit when the given activation condition is satisfied based on a detection result by the activation sensor.

18. The communication system according to claim 17, wherein the terminal device further comprises a charge unit configured to be charged by using power generated by the activation sensor of the activation unit.

19. The communication system according to claim 18, wherein power generated by the activation sensor of the terminal device is stored in the charge unit when the given activation condition is not satisfied.

20. The communication system according claim 16, wherein the at least one measurement sensor of the terminal unit comprises a plurality of measurement sensors.

21. The communication system according to claim 16, wherein the control unit of the terminal sensor is configured to switch the measurement sensor from the non-activated state to the activated state by switching a state in which power to the measurement sensor is not supplied to a state in which, when activated, power is supplied.

22. A method of activating a terminal device comprising the steps of:
activating a control unit by an activation unit when a given activation condition is satisfied;
switching a measurement sensor, when activated, from a non-activated state to an activated state by the control unit;
measuring a physical amount of a measurement target by the measurement sensor; and
transmitting by a communication unit information of a measurement result by the measurement sensor.

* * * * *